United States Patent [19]

Del Valle

[11] 4,187,992
[45] Feb. 12, 1980

[54] DEVICE FOR RECONSTITUTING USED COFFEE GROUNDS

[76] Inventor: Leon Del Valle, 10924 Aletta Ave., Culver City, Calif. 90213

[21] Appl. No.: 902,294

[22] Filed: May 3, 1978

[51] Int. Cl.$^2$ ............................................. B02C 23/00
[52] U.S. Cl. .................................. 241/65; 241/101 B; 241/248; 241/258
[58] Field of Search ............. 241/65, 225, 244, 278 R, 241/245, 248, 249, 257 R, 258, 101 B, 101.2, 152 A

[56] References Cited

U.S. PATENT DOCUMENTS

| | | | |
|---|---|---|---|
| 680,889 | 8/1901 | Schutz | 241/101 B |
| 1,327,385 | 1/1920 | Hammer | 241/258 X |
| 3,605,836 | 9/1971 | Schnell | 241/65 |
| 4,047,672 | 9/1977 | Volkov et al. | 241/65 X |

Primary Examiner—Richard B. Lazarus
Attorney, Agent, or Firm—Ben E. Lofstedt

[57] ABSTRACT

A device for reconstituting used coffee grounds for re-use, including a cup for receiving the coffee grounds, means for heating the cup, means for stirring the coffee grounds within the cup, valve means disposed beneath the cup for controlling the flow of the coffee grounds out of the bottom of the cup, grinding means beneath the cup and valve means for receiving the coffee grounds and for grinding the coffee grounds, and a receptacle for receiving and storing the coffee grounds as the coffee grounds exit from the grinding means.

7 Claims, 2 Drawing Figures

DEVICE FOR RECONSTITUTING USED COFFEE GROUNDS

BACKGROUND OF THE INVENTION

1. Field of the Invention

The present invention relates to the field of coffee mills and, more particularly, to coffee mills which include means for accepting wet, used coffee grounds, driving the water therefrom and re-grinding and storing the resultant reconstituted coffee grounds.

2. Description of the Prior Art

Devices found in the prior art are primarily designed for grinding coffee beans into grounds or involve the making of a liquid coffee beverage using water and ground coffee. Other grinding devices are found in the food preparation and processing art. Some even employ the application of heat as an essential part of the device.

One example of the prior art is disclosed in U.S. Pat. No. 3,605,836. This patent relates to a grinder with temperature regulation and stirring means, primarily useful for grinding meat, bread and similar products. However, in this particular device it should be noted that the stirring mechanism has the blades on the underside of the driving mechanism, and has a pair of coarse grinding wheels driven correspondingly by two motors. The obvious intent of this particular device is to break-up and grind relatively large sizes of food particles in a two stage process; a process and procedure which is quite different from the new and unique device disclosed herein. Further, this device fails to include a valve means for separately controlling the flow of particles to the lower grinding means, such as disclosed herein.

Another example of the prior art is found in U.S. Pat. No. 3,606,178 which pertains to a grinding mill for small laboratory samples and includes means for heating and cooling the chamber in which the samples are ground. The primary use and application of such an apparatus is for grinding into particular matter small items. Upon completion of the grinding process, the two separable chambers must be removed to empty the chamber, or it requires that the particles be scooped out with a spoon-like device. No provision is made for depositing and storing the particles immediately following the processing thereof. Additionally, this type of grinding apparatus is not capable of grinding fine particles, such as coffee grounds, into substantially finer particles. Further, a heating and cooling source, other than an electrically powered one, is required to heat or cool this chamber. For these reasons, this device is quite different than the subject invention disclosed herein.

A yet still further example is disclosed in U.S. Pat. No. 3,608,838 which relates to a rotary grinder which accomplishes its task by "cutting" rather than grinding as does your unit. From the nature of this device, it would appear to be primarily intended for cutting up tree limbs and the like rather than reducing small particles into yet still smaller particles. Additionally, this unit does not provide for heating of the grinding chamber, nor does it provide for receiving and storing the particulate, processed matter.

Other examples include: U.S. Pat. Nos. 3,685,748; 3,709,442; 3,734,417; 3,804,344; 3,837,587; 3,845,909; and 3,897,909.

3,685,748 concerns a device for grinding a foil waste material into a flowable, granular material. This unit is a simpler version of the device described in 3,608,838 and mentioned previously herein.

3,709,442 relates to a mill for refining cocoa, and the like. A mixture of cocoa is introduced into the chamber between the outer casing (A) and the rotor (B). The balls (C) are mounted in the rotor (B) and contact the inside of the casing (A) and grind the cocoa into a fine powder. The powder is exhausted through the upper ports identified as (D). A motor drives the rotor (B).

3,734,417 relates to a battery-powered pepper-grinding mill. This device is quite different in operation, purpose and function than the invention disclosed herein.

3,804,344 is a stirring and preparing apparatus for primarily fluids, and is quite different from the device representing the sum and substance of the Specification herein. It is cited as being of general interest.

3,837,587 relates to a combination ice crusher and drink mixer. Note the mechanical details. Nevertheless, this device is functionally and operationally distinct from the instant invention herein.

3,845,909 concerns a grinding apparatus for vegetable materials. Two grinding discs are employed to grind the materials therein. Because of this, this device is quite distinct from the subject matter of the Specification.

3,897,909 relates to a milling apparatus which is cooled by a water jacket arrangement, and this is the primary interest of disclosure for this particular patent.

SUMMARY OF THE INVENTION AND OBJECTS

Fundamentally, the subject invention disclosed herein relates to an apparatus for reconstituting used and wet coffee grounds. As such it includes, in substance, an externally-heated cup for receiving and drying a mixture of coffee grounds and having a set of blades therein mounted on a motor-driven shaft for stirring the mixture, valve means for controlling the flow of the coffee mixture into a cylindrical, vertically-arranged grinding mill assembly having a series of contiguously disposed, diagonally-arranged channels or grooves thereabout for re-grinding the coffee grounds, and a hopper-drawer disposed beneath the grinding mill to receive the dehydrated, re-ground coffee particles.

One important and primary object of the present invention is to provide a means for reconstituting used coffee grounds so that such grounds can be re-used in the making of a coffee beverage.

Another primary object of the instant invention is to provide a single unit for drying, regrinding and storing used coffee grounds so that such ground may be reused.

A yet still further important and primary object of the present invention is to provide an apparatus which can be readily employed in a restaurant to permit the convenient and cost-saving practice of reconstituting the coffee grounds for reuse in the making of a coffee beverage.

An object of the instant invention is to provide a combination device which can dry the used and wet coffee grounds, break the grounds up by stirring and heating the grounds, regrinding to further develop the useful wetted area of the grounds to provide improved leaching of the coffee taste into water when subjected to reuse, and to provide a storage means until desired for reuse.

Other characteristics, advantages and objects of this invention can be more readily appreciated from the following description and appended claims. When taken in conjunction with the accompanying drawings, this description forms a part of the Specification wherein like references and characters designate corresponding parts in several views.

DESCRIPTION OF THE PREFERRED EMBODIMENT

Figure 1:
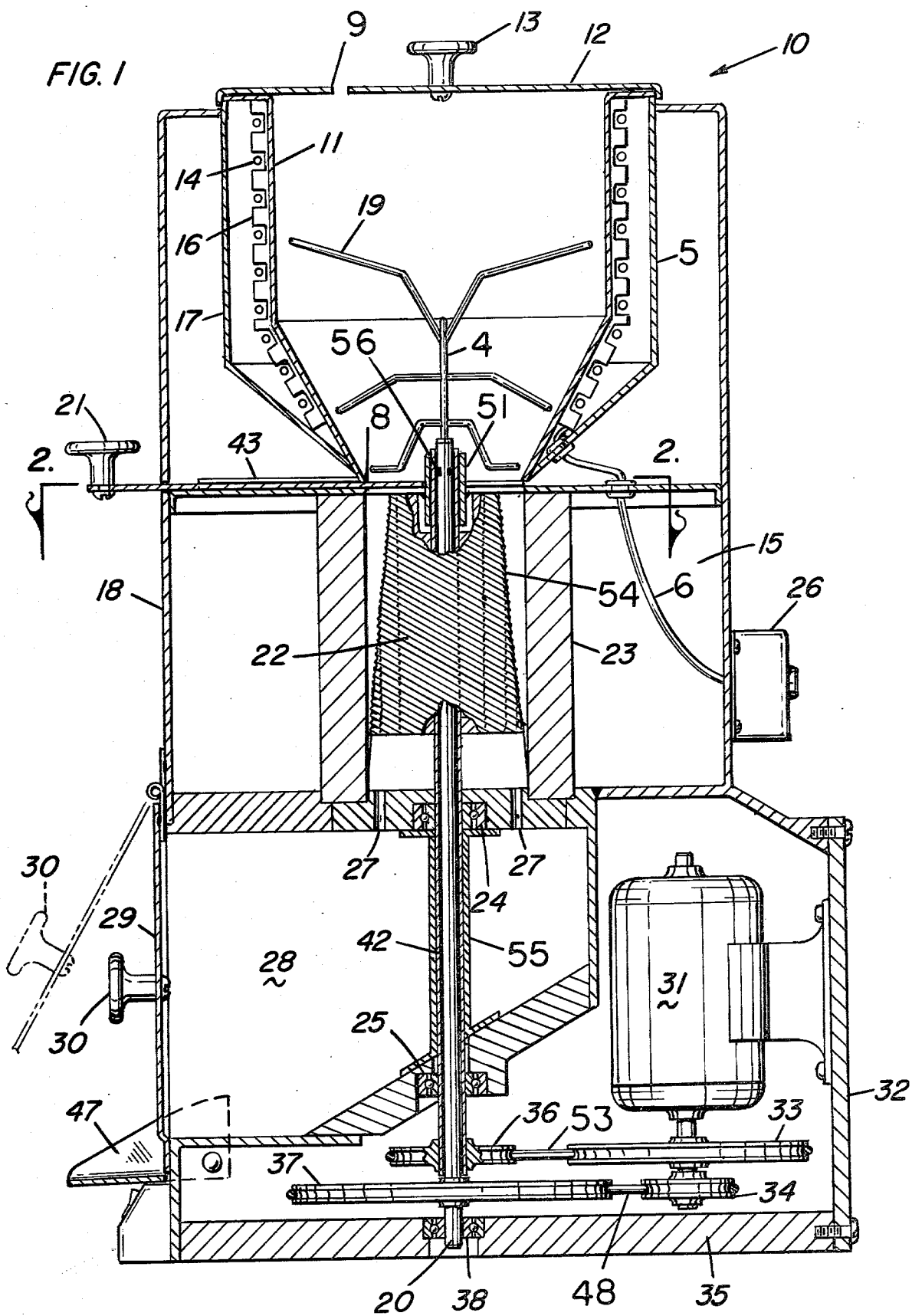
FIG. 1 is a vertical elevational view of the instant invention, in section.

With continuing reference now to the drawings, the invention herein disclosed is generally referred to at 10. Basically, the invention 10 is a device for reconstituting used coffee grounds for re-use, including a cup 11, an electrical heating coil 14 wrapped around the cup 11, a set of driven stirring blades 19 within the cup 11, a valve, generally indicated at 46, a grinding element 22 and a receptacle 28 for receiving and storing the reprocessed coffee grounds delivered from the grinding element 22.

With special emphasis now on FIG. 1, there is shown and depicted a vertical elevation of the invention 10, in section, and in its assembled form. At the upper portion of the invention 10 is a lid 12, which covers the open upper portion of the cup 11. A vent 9 is provided in the lid 12 for purposes which will become obvious as the description proceeds hereinafterwards. A knob 13 is provided on top of the lid 12 to permit the lid 12 to be manually removed and replaced on the cup 11 as desired or when appropriate.

The cup 11 is preferably formed of a metallic substance which is capable of withstanding relatively high temperatures and is compatible with food, especially coffee. One such metal is stainless steel. The cup 11 is divided into an upper portion and a lower portion. The lower portion is tapered to provide a funnel-like path by which to direct the contents of the cup 11 to the extremity of the lower portion of the cup 11 which is smaller in diameter than the upper open portion of the cup 11 covered by the lid 12. The extremity of the lower portion of the cup 11 is defined by the opening 8.

The exterior portion of the cup 11 is surrounded by a thermally-stable insulation 16, formed of material such as ceramic, having a series of grooved 7 thereabout. An electric resistance-type heating coil or element 14 is nested in the grooves 7. When so arranged, the heating element coils 14 are effectively spaced evenly apart to avoid direct contact between each of the other coils.

The electric heating element 14 is controlled by a control box 26 which is electrically coupled thereto via the electric cord 6.

In order to contain the heat generated by the electric heating element 14 about the cup 11 and to prevent other portions of the invention 10 from heating up, a second, but larger cup 5 is disposed about the first cup 11. Typically, this cup 5 is preferably formed also of stainless steel.

Housed within the cup 11 is a set of stirring blades 19. The stirring blades 19 are secured to a central, vertically-disposed rod 4. An O-ring seal 56, nested in a groove about the rod 4, provides a dynamic, fluid and coffee-grounds' proof seal thereabout.

Rod 4 is mechanically coupled to shaft 20. Shaft 20 is mechanically coupled to pulley 37 over which belt 48 rides. The belt 48 also rides about pulley 34 which is mechanically coupled to the shaft of the electric motor 31. Note, in the preferred embodiment, that pulley 34 is smaller in diameter than pulley 37, which, in effect, reduces the rotational speed of the shaft 20 from that of the electric motor shaft in direct proportion to the ratio of the radii of the pulleys 34 and 37.

The electric motor 31 is controlled by means of a front facing, panel mounted electric switch 49 which is electrically coupled to the motor 31 by means of an electric cord (not shown).

When the switch 49 is turned to its "on" position, the electric motor is activated, and caused the motor shaft to rotate. The motor shaft, in turn, through the pulleys 34 and 37 and the belt 48 cause the shaft 20 to turn, which causes the rod 4 to rotate, thereby turning the stirring blades 19 within the cup 11.

Figure 2:
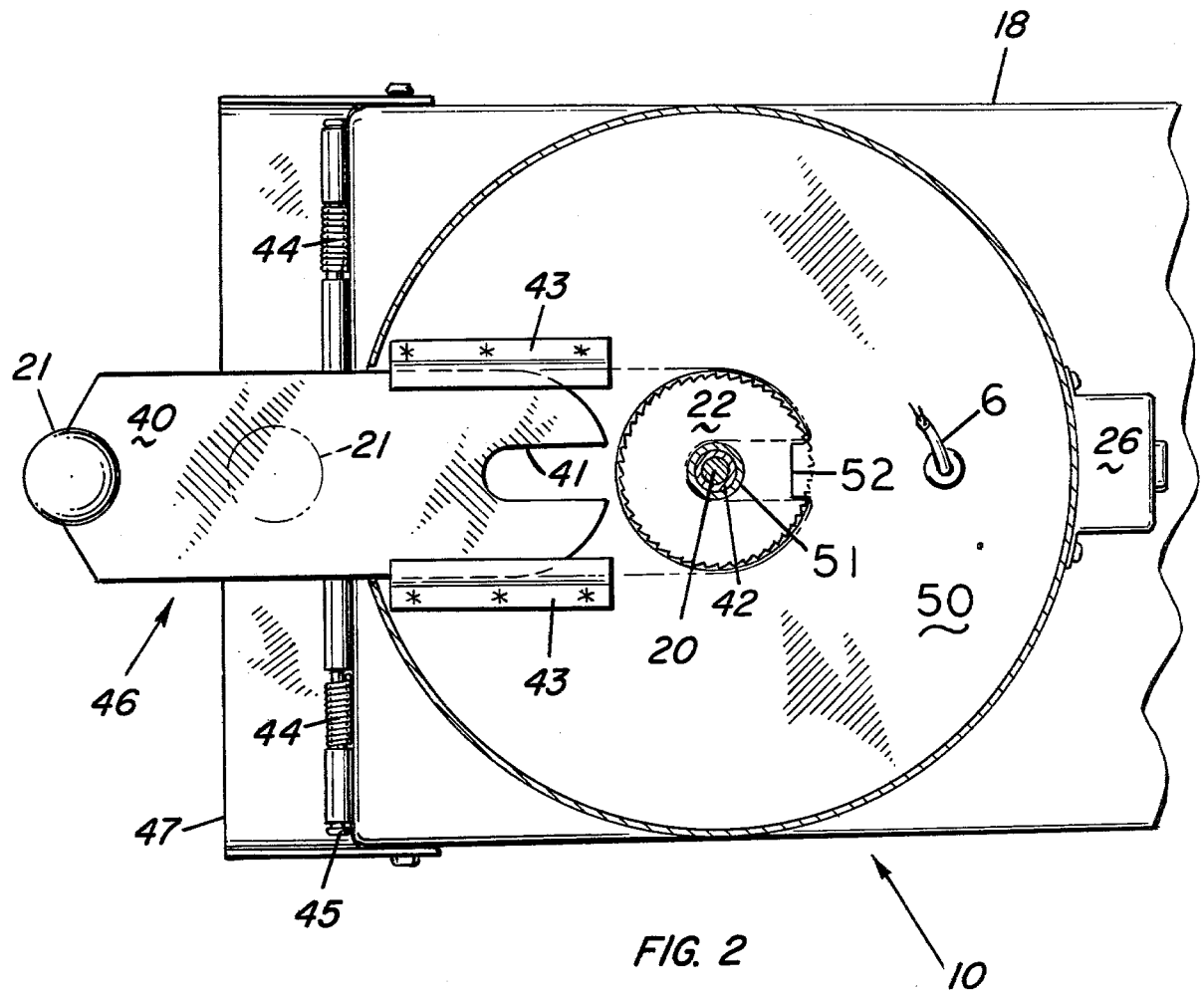
FIG. 2 is a view taken along Plane 2—2 of FIG. 1.

With reference now to both FIGS. 1 and 2, there is shown a valve, generally indicated at 46, which is provided at the opening 8 of the cup 11, to control the flow of coffee grounds in the cup 11 from the cup 11. Typically, the valve 46 is a slide valve which includes a sliding element 40, guided within a pair of alignment elements 43, disposed on either side of the sliding element 40. The alignment elements 43 are fixedly secured to an internal transverse baffle portion 50 of the housing 18. A knob 21 is fixedly secured to one end of the sliding element 40 to effectuate manual reciprocation thereof. At the opposite end of the sliding element 40 to engage the annular sleeve 51. This is necessary to permit the sliding element 40 to block the passage of the coffee grounds in the cup 11 to the grinding element 22. A fixed tab 52 completes the closure, in conjunction with the end of the sliding element 40.

A grinding element 22 tapered along its sides 54 is disposed beneath the opening 8 to the cup 11. When the sliding element 40 is in its open position, as shown in FIG. 2, the coffee grounds will pass between the housing 23 for the grinding element and the grinding element 22. The grinding element 22 has a series of diagonal grooves thereabout to urge the coffee grounds downwardly during the grinding process. The cylindrical grinding element 22 is fixedly secured to the hollow shaft 42. The lower end of the hollow shaft 42 is rotatably retained with respect to the housing 18 by a pair of bearings 24, 25 as well as the annular sleeve 51. The lowermost portion of the grinding element 22 forms a further grinding surface between itself and the housing 23.

The very lowermost extremity of the hollow shaft 32 is mechanically coupled to pulley 36. Pulley 36 is driven by a belt 53, which is engaged about pulley 33. Pulley 33, in turn, is fixedly secued to the shaft of the electric motor 31.

After coffee grounds pass below the grinding element 22, the coffee grounds are posited in a chamber 54 therebeneath. Afterwards, the coffee grounds are directed through the sieve apertures 27 and into the storage container 28. A stationary housing 55 is disposed about the rotatable hollow shaft 42 and is anchored to the fixed portion of the housing 18. Consequently, it effectively seals the bearings 24 and 25 from the coffee grounds which flow into and are posited in the storage chamber 28.

A hinged door 29 is provided to allow access from and into the storage container 28. A pair of springs 44 bias the hinged door 29 into a closed position to prevent the coffee grounds from escaping prematurely from the storage container 28.

A knob 30 is fixedly secured to the door 29 to allow manual operation thereof.

A trough 47 is provided along the bottom front portion beneath the door 29 and storage container 28, to direct the coffee grounds from the storage container 28 into a waiting coffee pot hopper (not shown).

The housing 18, as shown, includes a rear access panel 32 to provide for installation and removal of the electric motor 31. A base 35 is provided for the housing 18.

OPERATION OF THE INVENTION

The sliding valve element 40 is pushed all the way in to effectively close the valve 46. Thereafterwards, used, wet coffee grounds are placed in the cup 11. The electrical heating elements 14 are turned on by activating the switch 26 positioned to the rear of the housing 18. Following this, the electric switch 49 is turned on to activate the electric motor 31. Once the motor 31 is turning, both the stirring blades 19 and the grinding element 22 begin to rotate. The stirring blades 19 keep the used, wet coffee grounds moving to evenly heat the wet coffee grounds to drive the water therefrom. The water vapors are permitted to escape from the covered cup 11 via went 9 in the lid 12. Further, the stirring blades 19 break up the wet, collascent mass of coffee grounds to permit the coffee grounds to flow easily from the cup 11 when the valve 46 is opened.

When the used coffee grounds are flowable, the valve is opened and the grounds flow through the opening 8 in the bottom of the cup 11 into and around the grinding element 22 and between the grinding element 22 and the housing 23, where the coffee grounds are re-ground into smaller particles to increase the wetted area of the total coffee mass.

Following re-grinding, the coffee grounds are driven through the sieve apertures 27 into the storage container 28.

When needed these re-constituted coffee grounds are removed from the storage container 28 by opening the spring-biased closed door 29 by manually gripping the know 30 and pulling outwardly. The now-friable coffee grounds flow outwardly and into and out of the trough 47 and into a coffee pot hopper (not shown) for use.

Such re-constituted coffee grounds are intended for use in supplementing the use of not-previously-used coffee grounds in the preparation of a coffee beverage. As such, the cost of making the liquid coffee beverage is reduced.

It will be understood that the nature and embodiment of the invention herein described and illustrated is merely a convenient and useful form of the invention and that many changes may be made therein without departing from the spirit and scope of the invention.

What I claim as new and desire to protect by Letters Patent of the United States of America is:

1. A device for reconstituting used coffee grounds for re-use, comprising:
    (a) a cup having a rim thereabout with an opening in the bottom of the cup for receiving the coffee grounds and having an electrical heating element thereabout;
    (b) a removable cover cooperatively associated with the rim of the cup having a vent therein for the escape of gases therethrough;
    (c) stirring means for moving the coffee grounds within the cup and centrally disposed inside said cup and projecting upwardly therein through the opening in the bottom of the cup via a rotatable shaft;
    (d) gate valve means disposed beneath the cup for controlling the flow of the coffee grounds from the bottom of the cup;
    (e) frustro-conical grinding means arranged beneath the cup and the valve means for receiving the coffee grounds and for grinding the coffee grounds, said grinding means operably associated with the rotatable shaft of the stirring means;
    (f) cylindrical housing means operably disposed about the grinding means and arranged beneath the gate valve means;
    (g) sieve means disposed beneath the cylindrical housing means;
    (h) driving means operatively coupled to the stirring means and the grinding means for driving the stirring means and the grinding means; and
    (i) a receptacle disposed beneath the grinding means for receiving and storing the coffee grounds as the coffee grounds exit from the grinding means.

2. A device of claim 1 wherein the stirring means comprises a number of blades secured to a centrally-disposed shaft operatively disposed within the cup.

3. The device of claim 1, further comprising means for controlling the driving means.

4. The device of claim 1, further comprising housing means for housing the elements hereinbefore given.

5. The device of claim 1, wherein said driving means is an electrical motor.

6. The device of claim 1, wherein said driving means operatively coupled to the stirring means and the grinding means for driving the stirring means and the grinding means, comprises:
    (a) an electric motor;
    (b) a first shaft operativey coupled to said electric motor and said stirring means to drive said stirring means; and
    (c) a hollow shaft about said first shaft, said hollow shaft operatively coupled to said electric motor and said grinding means for grinding the coffee grounds.

7. A device for reconstituting used coffee grounds for re-use, comprising:
    (a) a cup for receiving the coffee grounds;
    (b) stirring means for moving the coffee grounds within the cup;
    (c) valve means disposed beneath the cup for controlling the flow of coffee grounds from the bottom of the cup;
    (d) grinding means arranged beneath the cup and the valve means for receiving the coffee grounds and for grinding the coffee grounds;
    (e) driving means operatively coupled to the stirring means and the grinding means for driving the stirring means and the grinding means, comprising:
    an electric motor;
    a first shaft operatively coupled to said electric motor and said stirring means to drive said stirring means;
    a hollow shaft about said first shaft, said hollow shaft operatively coupled to said electric motor and said grinding means for grinding the coffee grounds;
    means for driving said first shaft and said second shaft at different rotational rates; and
    (f) a receptacle disposed beneath the grinding means for receiving and storing the coffee grounds as the coffee grounds exit from the grinding means.

* * * * *